Patented Mar. 19, 1935

1,994,670

UNITED STATES PATENT OFFICE 1,994,670

METHOD OF REFINING PINEAPPLE JUICE

Ashton T. Scott, Radnor, Pa., assignor to The Sharples Specialty Company, Philadelphia, Pa., a corporation of Delaware No Drawing. Application October 1, 1932, Serial No. 635,853

14 Claims. (Cl. 99—11)

The present invention pertains to an improved process of refining pineapple juice which is to be canned with sliced pineapple. In the process of preparing pineapples for canning, the outer skins of the pineapples are first removed and the fruit cored, the main body of the pineapple being thereafter cut into slices which are canned without cooking. The cores and skins are thereafter subjected to a crushing operation and screened to yield a juice which is canned with the fruit slices. The juice obtained from the crushed fruit does not have the desired concentration for canning, however, and it is therefore necessary to subject it to a refining process to obtain a juice containing a high concentration of sugar. Certain impurities are also removed during this refining process.

Refining processes as now conducted involve undue expense incident to the addition of cane or other types of sugar to the juice in order to obtain the desired concentration and the present invention has for its principal object the elimination of the expense incident to the addition of such sugar.

According to a typical currently used method of refining the juice, it is first treated with filter clay and thereafter filtered at a temperature of approximately 180° F. to produce a clear juice containing approximately 10% sugar and 1% citric acid, the remainder consisting of water, color forming bodies and other impurities. The juice is next treated with a suitable alkali such as calcium hydroxide or calcium carbonate until its acidity is reduced to a pH of approximately 6, the calcium citrate formed in the reaction separating out as granular crystals. This calcium citrate is then separated from the juice by filtration. The juice is next subjected to treatment with a decolorizing carbon and filtered to remove color constituents. The purified juice is then concentrated by boiling under vacuum until it has reached a concentration of approximately 26% to 30% sugar.

The juice so obtained does not have a sufficiently high sugar concentration to render it suitable for use with the higher grades of canned pineapple and it is therefore necessary to add sugar to the juice. It is not feasible in the practice of the process above described, or any other commercially used process of the prior art, to concentrate the juice to a sufficient degree to render it most desirable for canning, as such concentration tends to darken the sugar when performed in connection with other conventional refining steps heretofore used.

In accordance with the practice of the process of the present invention it is possible to concentrate the sugar to the desired degree, even where a juice containing a concentration of 55% to 60% of sugar is required.

In the practice of this invention the raw juice is first subjected to a treatment with a suitable alkali such as calcium hydroxide until it shows a definitely alkaline reaction and is then subjected to a treatment at a relatively low temperature for the purpose of removing the color forming bodies. This first separation step should be performed at a temperature of less than 125° F. and I find that temperatures of 60° to 100° F. give the best results in this connection. A temperature of approximately 70° F. is preferred. When separation is performed upon the alkaline juice at these reduced temperatures, it is possible to remove the color-forming bodies without simultaneously removing the calcium citrate. The alkaline treatment which is performed prior to this initial separating step should not be carried to excess, as the juice must be subsequently acidified and the expense incident to such acidification is, of course, greater in cases where a large amount of alkali has been added. Excellent results have been obtained when alkali was added until the juice showed a pH of approximately 8.5. In any case, it is highly desirable to add sufficient alkali to give a definitely alkaline reaction to the juice, as such alkaline juice lends itself admirably to the selective separation of the impurities present to the exclusion of the calcium citrate as above described.

The separation of the impurities from the alkaline juice may be performed in any known way, but it is preferably accomplished by means of a centrifugal separator from which the clarified juice is discharged while the impurities collect adjacent the periphery of the centrifugal bowl. In this connection a centrifugal separator of the type shown in the patent to Nyrop No. 1,735,692 may be advantageously used, as a centrifuge such as described in that patent affords provision for the intermittent discharge of the solids without interruption of the operation of the machine. The bowl cake obtained in such centrifugal separation contains about 1.2% of the mass of the juice under treatment and consists of a gummy mass containing insoluble calcium salts of complicated organic acids. By centrifuging a juice treated with alkali to the degree described above in a substantially unheated condition, I have succeeded in removing the color forming and colloidal impurities to such a substantial degree that subsequent treatment in accordance with my process has enabled me to obtain the desired degree of concentration without the addition of sugar obtained from other sources.

The juice is next acidified until it shows an acid reaction of approximately pH 5.9 or 6. This acidification is preferably performed by means of citric acid as citric acid is a natural constituent of the juice, but other acids may, of course, be used in this connection. The acidified juice is then heated, filtered and subjected to a treatment with vegetable carbon to remove further color forming bodies. This filtration is accomplished at approximately 180° F. The calcium citrate may be removed from the juice either simultaneously with the color bodies removed by the decolorizing carbon, or this filtration treatment may be divided into two steps in which the calcium citrate is first removed and the color bodies are subsequently removed by a decolorizing carbon treatment and second filtration. A centrifugal separator may also be utilized to obtain this final separation of the calcium citrate and decolorizing carbon from the acidified juice, if desired.

After the juice is treated as above described it may be evaporated under vacuum to the desired concentration, even where such concentration is very high, as described above. Juice treated in this manner is not subject to the objectionable decolorizing effect referred to above in connection with juices treated by currently known methods and it is therefore possible to concentrate it to a sugar concentration of 55% or 60% without encountering any objectionable color.

While I have described a process involving a specific sequence of steps and treatment with specific materials, I wish it to be understood that my invention is by no means limited in its broad scope to the exact treatment specified. The sequence of the carbon treatment and concentration may, for example, be reversed or these two steps may be performed simultaneously, the carbon being added to the unheated juice and retained in contact therewith by mild agitation during the heating step.

It will be seen that my invention comprises as its essential features the removal of the objectionable color-forming bodies during the initial treatment of the juice prior to its concentration and that such removal has been accomplished by means of an alkaline treatment and a separation step performed under conditions of temperature and alkalinity facilitating the selective separation of other impurities to the exclusion of the citric acid salt formed by the alkaline treatment.

Modifications will be obvious to those skilled in the art and I do not therefore wish to be limited except by the scope of my sub-joined claims as interpreted in the light of the generic spirit of my invention.

What I claim is:

1. The method of refining fruit juices, such as pineapple juice, which comprises preliminarily treating the juice with an alkaline compound of an alkali earth metal to facilitate the selective separation of color forming bodies and other impurities from such juice to the exclusion of the citric acid salt produced by such alkaline treatment, effecting such selective separation and thereafter acidifying and heating the juice and separating the citric acid salt from the juice.

2. The method of refining fruit juices, such as pineapple juice, which comprises preliminarily treating the jiuce with an alkaline compound of an alkali earth metal to facilitate the selective centrifugal separation of color forming bodies and other impurities from such juice to the exclusion of the citric acid salt produced by such alkaline treatment, effecting such selective centrifugal separation and thereafter acidifying and heating the juice and separating the citric acid salt from the juice.

3. The method of refining fruit juices, such as pineapple juice, which comprises preliminarily treating the juice with an alkaline compound of an alkali earth metal to facilitate the selective separation of color forming bodies and other impurities from such juice to the exclusion of the citric acid salt produced by such alkaline treatment, effecting such selective separation, and thereafter acidifying and heating the juice, separating the citric acid salt from the juice and concentrating the juice.

4. The step in a method of refining fruit juices, such as pineapple juice, which comprises preliminarily removing color forming bodies from such juice by treatment with an alkaline compound of an alkali earth metal and mechanical separation while maintaining the temperature below 125° F.

5. The step in a method of refining fruit juices, such as pineapple juice, which comprises removing color forming bodies from such juice by treatment with an alkaline compound of an alkali earth metal and mechanical separation while maintaining the temperature below 125° F., thereafter raising the temperature to approximately 180° F. and removing other impurities therefrom at such elevated temperature.

6. The method of refining fruit juices, such as pineapple juice, which comprises treating such juice with an alkaline compound of an alkali earth metal until the juice shows an alkaline reaction, separating the color forming impurities from such juice while maintaining the temperature below 125° F., thereafter heating and acidifying the juice and separating it from the citric acid salts formed by the alkali treatment and concentrating the juice so separated.

7. The method of refining fruit juices, such as pineapple juice, which comprises treating such juice with an alkaline compound of an alkali earth metal until the juice shows an alkaline reaction, separating the color forming impurities from such juice while maintaining the temperature below 125° F., thereafter heating the juice to substantially 180° F. and acidifying the juice and separating it from the citric acid salts formed by the alkali treatment and concentrating the juice so separated.

8. The method of refining fruit juices, such as pineapple juice, which comprises treating such juice with an alkaline compound of an alkali earth metal until the juice shows an alkaline reaction, separating the color forming impurities from such juice while maintaining the temperature at approximately 70° F., thereafter heating and acidifying the juice and separating it from the citric acid salts formed by the alkali treatment and concentrating the juice so separated.

9. The method of refining fruit juices, such as pineapple juice, which comprises treating such juice with an alkaline compound of an alkali earth metal until the juice shows an alkaline reaction, separating the color forming impurities from such juice while maintaining the temperature substantially within the range between 60° F. and 100° F., thereafter heating the juice to substantially 180° F. and acidifying the juice and separating it from the citric acid salts formed by the alkali treatment and concentrating the juice so separated.

10. The method of refining fruit juices, such as pineapple juice, which comprises treating such juice with an alkaline compound of an alkali earth metal until it shows an alkaline reaction of approximately pH 8.5, separating the color forming impurities from such juice while maintaining the temperature below substantially 125° F., thereafter heating and acidifying the juice and separating it from the citric acid salts formed by the alkali treatment and concentrating the juice so separated.

11. The method of refining fruit juices, such as pineapple juice, which comprises first treating such juice with an alkaline compound of an alkali earth metal until it shows an alkaline reaction of approximately pH 8.5, then separating the color forming impurities from the juice while maintaining the temperature below 125° F., thereafter heating the juice to substantially 180° F., acidifying the juice to a pH of approximately 5.9, separating the citric acid salt formed by the action of the alkali, removing further impurities by means of decolorizing carbon treatment and concentrating the juice.

12. The method of refining fruit juices, such as pineapple juice, which comprises first treating such juice with an alkaline compound of an alkali earth metal until it shows an alkaline reaction of approximately pH 8.5, then separating the color forming impurities from the juice while maintaining the temperature below 125° F., thereafter heating the juice to substantially 180° F., acidifying the juice to a pH of approximately 5.9, separating the citric acid salt formed by the action of the alkali, removing further impurities by means of decolorizing carbon treatment and concentrating the juice, the steps being performed in the order named.

13. The method of refining fruit juices, such as pineapple juice, which comprises first treating such juice with an alkaline compound of an alkali earth metal until it shows an alkaline reaction of approximately pH 8.5, then centrifugally separating the color forming impurities from the juice while maintaining the temperature below 125° F., thereafter heating the juice to substantially 180° F., acidifying the juice to a pH of approximately 5.9, separating the citric acid salt formed by the action of the alkali, removing further impurities by means of decolorizing carbon treatment and concentrating the juice.

14. The method of refining fruit juices, such as pineapple juice, which comprises first treating such juice with an alkaline compound of an alkali earth metal until it shows a definite alkaline reaction, then separating the precipitated color forming impurities from the juice while maintaining the temperature below 125° F., acidifying the juice to a condition of definite acidity, then heating the juice to a temperature adapted to effect precipitation of citric acid salts and thereafter separating such salts from the juice.

ASHTON T. SCOTT.